Feb. 13, 1940.  J. A. CERNY  2,189,882
THERMOSTATIC VALVE MECHANISM
Filed Aug. 7, 1937   2 Sheets-Sheet 2
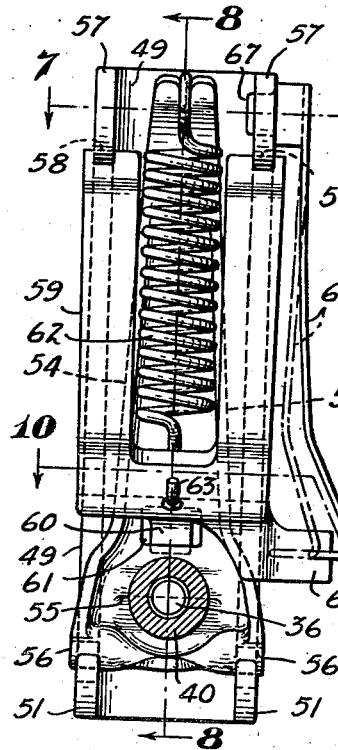
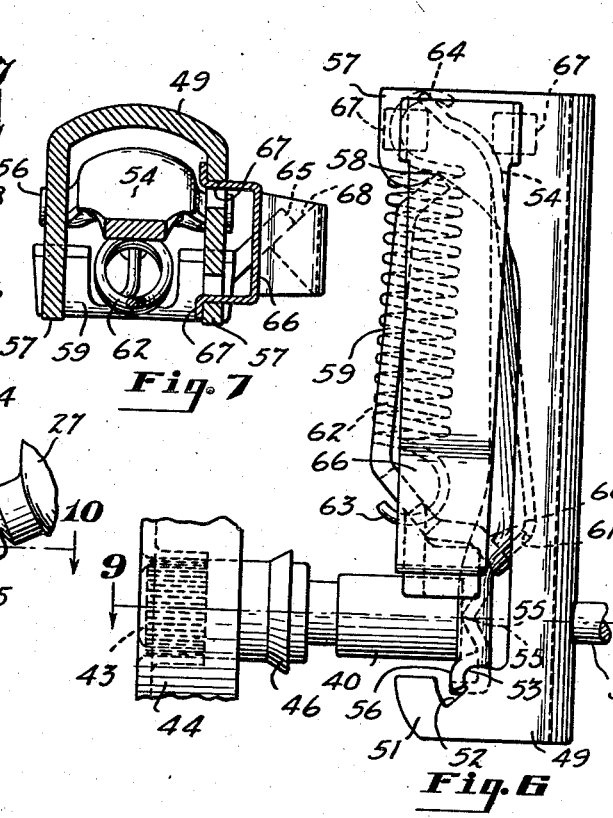
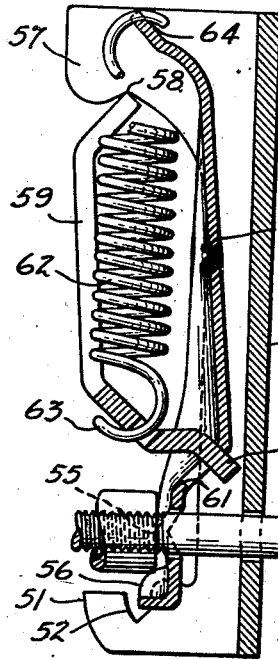
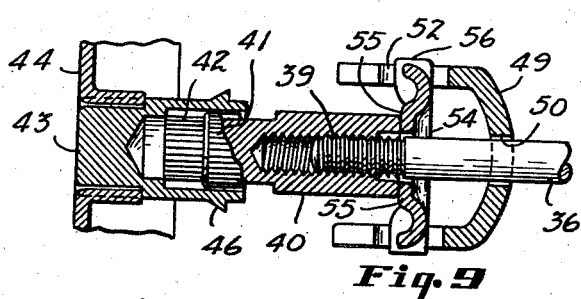
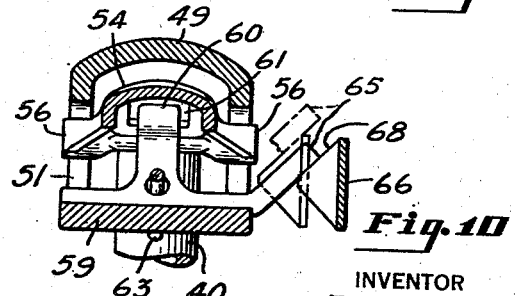
INVENTOR
Joseph A. Cerny
BY
ATTORNEYS Patented Feb. 13, 1940

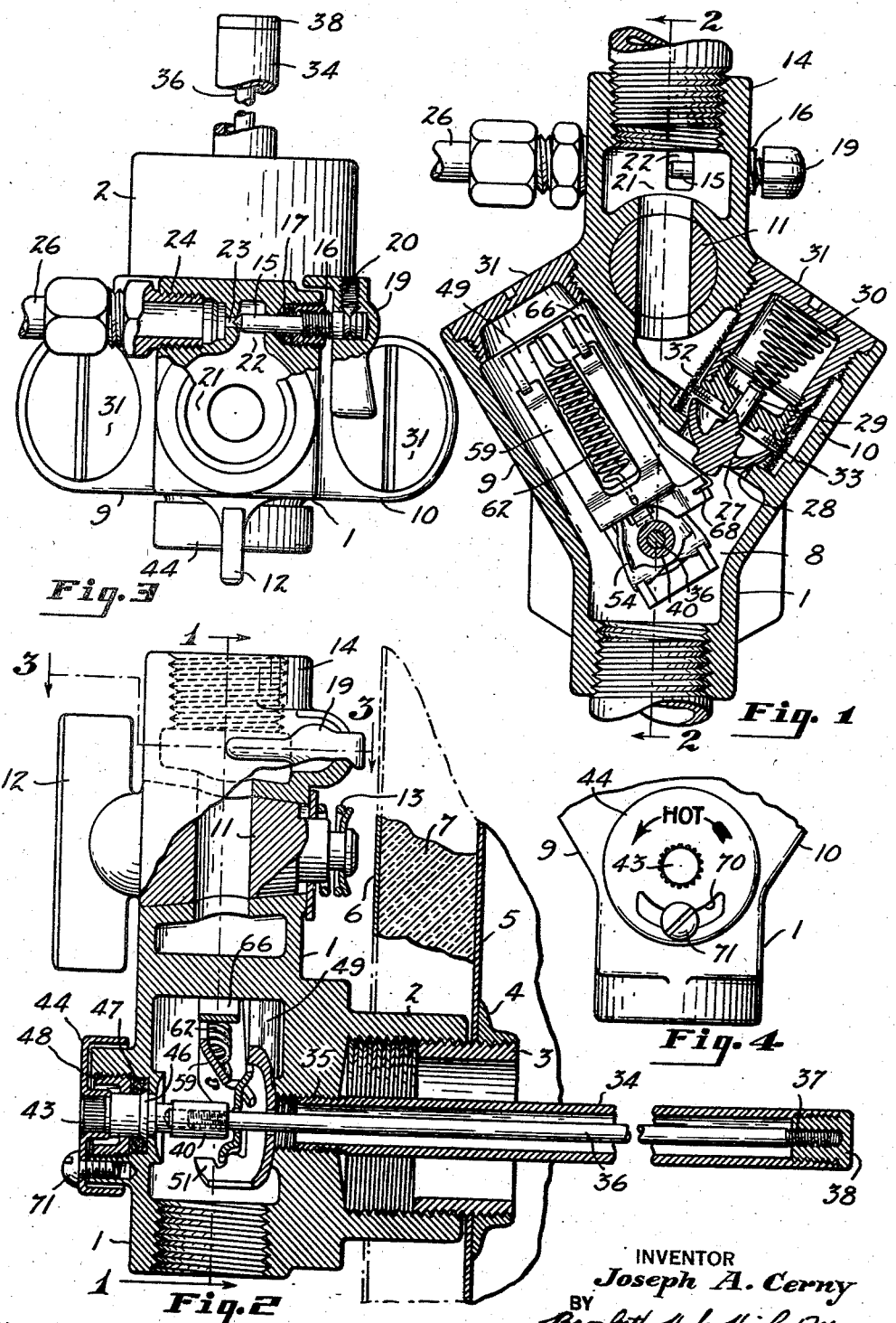

2,189,882

UNITED STATES PATENT OFFICE 2,189,882

THERMOSTATIC VALVE MECHANISM

Joseph A. Cerny, Cleveland, Ohio, assignor to The Titan Valve and Manufacturing Company, Cleveland, Ohio, a corporation of Ohio Application August 7, 1937, Serial No. 157,838

2 Claims. (Cl. 236—48)

This invention relates to thermostatic valve mechanism, such as is used for controlling the flow of gas to a fuel burner used for heating water, as in connection with domestic hot water heating, where the mechanism is sensitive to the temperature of the water to be heated.

One object of the invention is to provide improved mechanism of this kind which is of compact form and of reduced over-all length and so arranged that when installed on a water boiler all the parts lie very close to the boiler and do not project out therefrom so far as with previous constructions for the same purpose.

A further object of the invention is to provide improved mechanism of this kind arranged to afford convenient access to the inner parts for installation, replacement or repair.

A further object of the invention is to provide improved thermostatic valve mechanism in which a thermostatically operated part moves a lever in one plane and a cam connection transmits this movement to a valve actuator movable in a plane transverse to the plane of lever movement.

A further object of the invention is generally to improve the valve mechanism to reduce the number of parts and to simplify the construction and operation of a mechanism of this kind.

Further objects of the invention are in part obvious and in part will appear more clearly from the description to follow. The essential feature will be summarized in the claims.

Fig. 1 of the drawings represents a sectional elevation on the line 1—1, Fig. 2, through valve mechanism embodying the invention;

Fig. 2 is a sectional elevation on the line 2—2, Fig. 1;

Fig. 3 is a plan view partly in section on the line 3—3 of Fig. 2 showing the pilot valve construction;

Fig. 4 is an end elevation from the left in Fig. 2 showing the temperature regulating device;

Fig. 5 is an enlarged detail view corresponding to Fig. 1, showing certain of the operating levers and other mechanism in full lines corresponding to valve open position and in broken lines corresponding to valve closed position;

Fig. 6 is a side elevation from the right in Fig. 5;

Fig. 7 is a sectional plan view on approximately the line 7—7, Fig. 5;

Fig. 8 is substantially a sectional elevation on the line 8—8, Fig. 5, showing the parts in valve closed position;

Fig. 9 is a transverse sectional view on the line 9—9, Fig. 6; and

Fig. 10 is a transverse sectional view on the line 10—10, Fig. 5, showing in full lines the position of the parts corresponding to valve open position and in broken lines the position of the parts corresponding to valve closed position.

The valve mechanism shown in the drawings comprises a hollow casing or body 1 provided with a base connection 2, shown as internally threaded, for connection to the water tank, such as by threaded connection to a nipple 3 screwed into a spud 4 on the tank 5. 6 illustrates an outer casing or jacket for the tank, spaced from the tank wall 5 by insulation 7, Fig. 2 illustrating how the valve parts in the present construction may be brought and lie very close to the jacket 6. The valve body 1 is provided with an inner chamber 8 extending into hollow arms 9, 10 lying at an angle to each other in Y-formation, the arm 9 enclosing the lever mechanism and the arm 10 the valve mechanism, as shown in Fig. 1. Above and between the arms 9 and 10 the casing is provided with an opening to receive a tapered gas cock 11 having an operating head 12 exposed at the front of the valve mechanism and held to its seat by a spring 13, Fig. 2. This valve 11 is the A valve and its port controls flow of gas from the supply connection 14 to the chamber 8 by way of the valve in the hollow arm 10, as will later appear.

On the line side of the valve 11 is located a B valve for a pilot line. This valve, shown in Fig. 3, comprises a stem 15 having a threaded connection with a nut 16 and secured against leakage by packing 17 held in place by the nut 16 which also acts as a packing gland. Attached to the outer end of the stem is an operating head or handle 19 non-rotatably secured to the stem by the screw 20. By rotating the stem 15 by its handle 19 gas flow from the supply channel 21 by way of a port 22 and through channel 23 to connection 24 and pilot line 26 is regulated, as will be obvious.

As before stated, hollow arm 10 encloses the thermostatically operated valve, which may be of ordinary form. It is shown as including a valve 27 cooperating with a seat at the edges of a port or opening 28, said valve being mounted on a stem 29 and normally held to its seat by a spring 30 enclosed within a plug 31 threaded into the casing. On said plug is sleeved a filter screen 32 and within it is threaded a guide 33 having an opening through which the valve stem slides. By unscrewing the plug 31 the valve, screen, plug, guide, and spring may be removed as a unit for replacement, adjustment or repair.

The thermostatic elements may be of any suitable form and as shown comprise a member relatively expansible by heat, such as the copper tube 34 threaded at 35 into the casing, and a member relatively non-expansible by heat, such as the steel rod 36 threaded at 37 into a plug 38 threaded into tube 34. The inner end of rod 36 is threaded at 39 into an adjusting member 40 provided at its outer end with a head 41 longitudinally ribbed to correspond with and sliding within ribs in a recess 42 of an operator 43 provided with a head 44 accessible at the outside of and at the front of the casing. Member 43 is rotatable in but is sealed within the casing wall, for which purpose it is provided with a tapered collar 46 (Fig. 2) to receive a packing 47 compressed by a gland nut 48.

A base member or support 49 extends in the direction of the cavity 9 within the casing and supports a snap action lever combination for transmitting motion from the thermostatic element to the valve 27. This support has an opening at 50 through which the rod 36 passes. The support 49 is generally channel shaped in section and has at its lower end a pair of arms 51 notched as at 52 and having rounded shoulders at 53 to act as a pivotal support for an actuating lever 54. This lever has portions deformed outwardly at 55 forming knife edges engaging the member 40. At its lower end portions 56 are formed to engage the rounded shoulders 53, thus forming a pivot for the lever. The support 49 at its upper end has a pair of outwardly extending arms 57 for pivotally supporting at 58 a bifurcated lever 59. This lever extends substantially parallel to and in the opposite direction from lever 54 and has a tongue 60 at its free end which enters an opening 61 in lever 54 by which the movement of lever 59 is guided and limited. A helical tension spring 62 has one end 63 connected with lever 59 and its other end at 64 carried by the free end of lever 54. The arrangement of the spring and the two levers is such that oscillation of lever 54 carries the center line or line of tension of spring 62 back and forth on opposite sides of the pivot 58, thus causing a snap action of lever 59. Rigid with lever 59 and nearer its lower end is a cam 65 positioned to coact with the valve 27 to control the opening and closing of the valve in accordance with movement of lever 59. In the form shown the cam 65 is a piece of metal integral with and bent outwardly from the metal of lever 59.

While the cam 65 might engage directly the end of valve 27 to actuate it, I preferably provide a cam plate 66 which may be of spring metal having ears 67 at its upper end which enter suitable openings in the support 49 so that the member 66 may be snapped in position and will remain there. At its lower end the member 66 carries a cam face 68 adapted to coact with the cam 65 on lever 59. In the form shown the coacting faces on cams 65 and 68 are at aproximately 45° to the line of movement of member 66.

Assuming the parts in the full line position of Figs. 5 and 10 and in the position shown in Fig. 6, valve 27 is open, gas is flowing to the heater and the temperature of the water is rising. When the temperature rises to the degree determined by the setting of the thermostat, tube 34 expands and rod 36 moves to the right, carrying with it the adjusting member 40 and knife edges 55. This turns lever 54 in a clockwise direction about its pivot at 53, thereby moving its free end toward the right as viewed in Figs. 6 and 8, thus carrying the center line of spring 62 from the left side of pivot 58 to the right side thereof, or to the position shown in Fig. 8. Lever 59 and cam 65 then move by a snap action from the full line position of Figs. 5 and 10 to the dotted line position, permitting valve 27 to close. The temperature of the water will then gradually fall until the predetermined low temperature limit is reached, when the contraction of tube 34 permits reverse action of the parts with a snap movement of lever 59 in the opposite direction to its original or full line position of Figs. 5 and 10, thereby opening the valve. The parts return under the influence of spring 62 which always tends to move lever 54 counterclockwise.

During variations in temperature of the water rod 36 moves endwise back and forth carrying with it member 40, but the splined or driving connection 41, 42 leaves unaffected the driving relation between member 40 and the adjusting device 43 with its operating head 44 accessible on the outside of the casing. Preferably said head is provided with a circumferential slot 70 to receive a securing screw 71, the ends of the slot limiting the adjusting movement in opposite directions, and the screw enabling head 44 to be clamped in any adjusted position.

Reference to Fig. 2 illustrates how comparatively shallow the outer casing and its contained parts is. In other words, both the levers and the valve are in the same plane and particularly a plane transverse to the axis of the thermostatic elements, instead of projecting endwise outwardly parallel to or alongside of the thermostatic elements. The total projection of the parts from the outer wall or shell of the water tank is therefore materially reduced.

It will be noted that the cam connection 65 provides a very simple arrangement whereby the movement of levers 54 and 59 in the cavity arm 9 is transmitted to the valve 27 in the cavity arm 10. This is a very efficient connection at this point requiring very little in the way of parts and having little, if any, possibility of failure during the life of the equipment.

Preferably the threaded connections between rod 36 and member 40, between rod 36 and plug 38 and between plug 38 and tube 34 are all of the same pitch, so that upon rotative adjustment of member 40 relative rotation at any of the threaded connections described will effect longitudinal adjustment of rod 36 for setting the device for temperature.

Further advantages of the invention will be apparent to those skilled in the art.

What I claim is:

1. Thermostatic valve mechanism, comprising a chambered casing provided with fuel supply and discharge connections, said casing having hollow arms whose axes intersect and lie in the same plane and diverge in Y form, the cavities in said arms communicating with the casing chamber, a valve in the cavity of one arm, valve operating mechanism, including a main lever pivotally mounted in said chamber upon an axis parallel with said plane, and lever mechanism operated thereby and located in the cavity of said other arm and movable back and forth in a direction normal to said plane and operating said valve, and thermostatic means including a rod extending into said casing at said intersection in a direction normal to said plane and engaging and operating said main lever.

2. Thermostatic valve mechanism, comprising a chambered casing provided with fuel supply and discharge connections, said casing having hollow arms whose axes intersect and lie in the same plane and diverge in Y form, the cavities in said arms communicating with the casing chamber, a valve in the cavity of one arm movable back and forth lengthwise of its axis, valve operating mechanism, including a main lever pivotally mounted in said chamber upon an axis parallel with said plane, and lever mechanism operated thereby and located in the cavity of said other arm and movable back and forth in a direction normal to said plane, a motion transmitting member secured in the casing and having a part lying opposite said valve for operating the same, said lever mechanism and motion transmitting member being provided with interengaging cam parts adapted upon operation of said lever mechanism to actuate said motion transmitting member, and thermostatic means including a rod extending into said casing at said intersection in a direction normal to said plane and engaging and operating said main lever.

JOSEPH A. CERNY.